US00RE36922E

United States Patent [19]

Sparks et al.

[11] E Patent Number: Re. 36,922

[45] **Reissued Date of Patent: *Oct. 24, 2000**

[54] PROCESS OF USED LUBRICANT OIL RECYCLING

[75] Inventors: Steven W. Sparks, Cherry Hill, N.J.; Gerald J. Teitman, Vienna, Va.; Salvatore T. M. Viscontini, Holland, Pa.

[73] Assignee: Mobil Oil Corporation, Fairfax, Va.

[ * ] Notice: This patent is subject to a terminal disclaimer.

[21] Appl. No.: 08/200,050

[22] Filed: Feb. 22, 1994

Related U.S. Patent Documents

Reissue of:

[64] Patent No.: 5,143,597
Issued: Sep. 1, 1992
Appl. No.: 07/639,647
Filed: Jan. 10, 1991

[51] Int. Cl.[7] ..... C10G 9/14

[52] U.S. Cl. ..... 208/131; 208/179; 208/177

[58] Field of Search ..... 208/131, 177, 208/179

[56] References Cited

U.S. PATENT DOCUMENTS

| | | | |
|---|---|---|---|
| 3,625,881 | 12/1971 | Chambers et al. | 208/179 |
| 3,923,643 | 12/1975 | Lewis et al. | 208/179 |
| 4,033,859 | 7/1977 | Davidson et al. | 208/179 |
| 4,043,898 | 8/1977 | Kegler | 208/131 |
| 4,073,720 | 2/1978 | Whisman et al. | 208/180 |
| 4,101,414 | 7/1978 | Kim et al. | 208/18 |
| 4,118,281 | 10/1978 | Yan | 201/2.5 |
| 4,235,703 | 11/1980 | Kegler et al. | 208/131 |
| 4,302,324 | 11/1981 | Chen et al. | 208/131 |
| 4,390,409 | 6/1983 | Audeh | 208/8 |
| 4,435,270 | 3/1984 | Audeh | 208/11 |
| 4,490,245 | 12/1984 | Mead et al. | 208/179 |
| 4,512,878 | 4/1985 | Reid et al. | 208/179 |
| 4,797,198 | 1/1989 | Wetzel et al. | 208/181 |
| 4,800,015 | 1/1989 | Simmons | 208/180 |
| 4,874,505 | 10/1989 | Bartilucci et al. | 208/131 |
| 4,919,793 | 4/1990 | Mallari | 208/131 |
| 5,248,410 | 9/1993 | Clausen et al. | 208/131 |

*Primary Examiner*—Helane Myers
*Attorney, Agent, or Firm*—Malcolm D. Keen

[57] ABSTRACT

A used lubricant oil recycling process is disclosed in which a used lubricating oil is injected to a delayed coker downstream of the coker furnace whereby the used oil is thermally cracked into hydrocarbon fuel products which are low in metal contaminants, sulfur and nitrogen. The used lubricant can be preheated in an independent heater to avoid a quenching effect of the process stream when added in an amount greater than about 3% by volume based on the entire volume of the feed.

25 Claims, 2 Drawing Sheets

PROCESS OF USED LUBRICANT OIL RECYCLING

Matter enclosed in heavy brackets [ ] appears in the original patent but forms no part of this reissue specification; matter printed in italics indicates the additions made by reissue.

FIELD OF THE INVENTION

The invention relates to a process for reclaiming used lubricating oils and an economical process of producing a full range of refinery liquid and gaseous products from used lubricants. Specifically, the invention relates to converting used lubricating oils into quality hydrocarbon products by injecting the used oil as a feed to a delayed coker downstream of the coker furnace.

BACKGROUND OF THE INVENTION

Depletion of the world's petroleum reserves and increased concern for the environment are incentives for refiners to search for methods of reclaiming used lubricating oils.

The growing concern for environmental protection has prompted Congressional interest in mandating waste recycling laws. Used lubricating oils are among the wastes of interest. Proposed legislation has been directed towards implementing management standards for used oil recycling. The major focus of certain proposals has been to reintroduce used lubricants to the refinery process. Specific proposals include requiring refiners to recycle a yearly amount of used oil equal to a certain percentage of their total lubricant oil production, reintroduce the used oil into refinery processes for purposes of producing useable petroleum products and commence a credit system in which lubricant recyclers create credits for used lubricant recycling by actually recycling the oil through reintroduction to refinery processes or by purchasing recycling credits from recyclers in order to comply with the mandatory recycling percentage.

Even though the recycling of used lubricating oil by reintroduction into the refinery process has only been proposed, the refiner would benefit from the ability to recycle lubricating oils by reintroducing the oil into the refinery process. However, problems with reintroducing used oil to the refinery process are severalfold. Certain residual materials such as metals and lubricant additives in the lubricating oils present serious logistical problems to the refinery process. Problems include locating a process step which can accept used lubricating oils without the risks of fouling catalysts, contaminating process streams and causing coking and fouling of the process lines.

One approach would be to re-refine the oils to produce a lubricant stock. However, re-refining the used oils to produce base lubricant oil stocks is not a completely satisfactory approach because the known processes produce large quantities of sludge which present disposal problems. Morover, purification procedures required to pretreat the used oil are costly and can change the quality of the base oil resulting in a product of low quality.

SUMMARY OF THE INVENTION

In view of the environmental concerns for hazardous liquid waste disposal methods and the scarcity of fuel reserves, there is a need for technology which can convert the waste lubricants into useful liquid hydrocarbon fuels.

It has now been found that a delayed coking process can be used to convert untreated, used lubricant into lighter, high-quality products. The used lubricants are collected and the hydrocarbons contained in the lubricants are thermally coked or vaporized to produce lighter fuel products. In the process, the reclaimed oil is introduced to the heated coker feed downstream of the coker furnace at a rate sufficient to maintain the temperature of the coker process stream at a temperature sufficient for delayed coking and to prevent premature coking of the feed. The feedstock is then transmitted to delayed coking drums during the normal coking portion of the delayed coking process. Inorganic, non-hydrocarbon contaminants contained in the used oil become concentrated on the coke product and the hydrocarbon constituents are thermally cracked to form liquid hydrocarbon components which are of higher value as combustion fuels. The contaminants do not, to any unacceptable degree, show up in the final liquid product or in refinery emissions. Thus, the lubricant contaminants which are typically metals, sulfur and chlorides do not present the refinery processing problem encountered in known used lubricant reclaiming processes. Any contaminants are in a form which can be handled by conventional refinery techniques.

THE DRAWINGS

In the accompanying drawings

DETAILED DESCRIPTION OF THE INVENTION

The invention is directed to a process of used lubricant oil recycling which comprises: feeding the used lubricant into a coker by mixing it with a coker feedstock heated to an elevated coking temperature in a coker furnace downstream of the coker furnace and carrying out delayed coking of the feedstock in a coker drum from which the coke and liquid coker products are removed.

Briefly, the delayed coking process is an established petroleum refinery process which is, typically, used on very heavy low value residuum feeds to obtain lower boiling products of greater quality. It can be considered a high severity thermal cracking or destructive distillation and is used on residuum feedstocks containing nonvolatile asphaltic materials which are not suitable for catalytic cracking operations because of their propensity for catalyst fouling or for catalyst deactivation by their content of ash or metals. Coking is generally used on heavy oils, especially vacuum residua, to make lighter components that can then be processed catalytically to form products of higher economic value. In the delayed coking process, the heavy oil feedstock is heated rapidly in a tubular furnace to a coking temperature which is usually at least 450° C. (about 840° F.) and, typically 450° C. to 500° C. (about 840° F. to 930° F.). From there it flows directly to a large coking drum which is maintained under conditions at which coking occurs, generally with temperatures of about 430° C. to 450° C. (about 800° F. to 840° F.) under a slight superatmospheric pressure, typically 5–100 psig. In the coking drum, the heated feed thermally decomposes to form coke and volatile liquid products, i.e., the vaporous products of cracking which are removed from the top of the drum and passed to a fractionator. When the coke drum is full of solid coke, the feed is switched to another drum and the full drum is cooled by a water quench and emptied of the coke product. Generally, at least two coking drums are used so that one drum is being charged while coke is being removed from the other.

Typical examples of conventional coker petroleum feedstocks include residues from the atmospheric or vacuum distillation of petroleum crudes or the atmospheric distillation of heavy oils, visbroken resids, tars from deasphalting units or combinations of these materials. Typically, these feedstocks are high-boiling hydrocarbons that have an initial boiling point of about 350° F. or higher and an API gravity of about 0° to 20° and a Conradson Carbon Residue content of about 0 to 40 weight percent.

Figure 1:
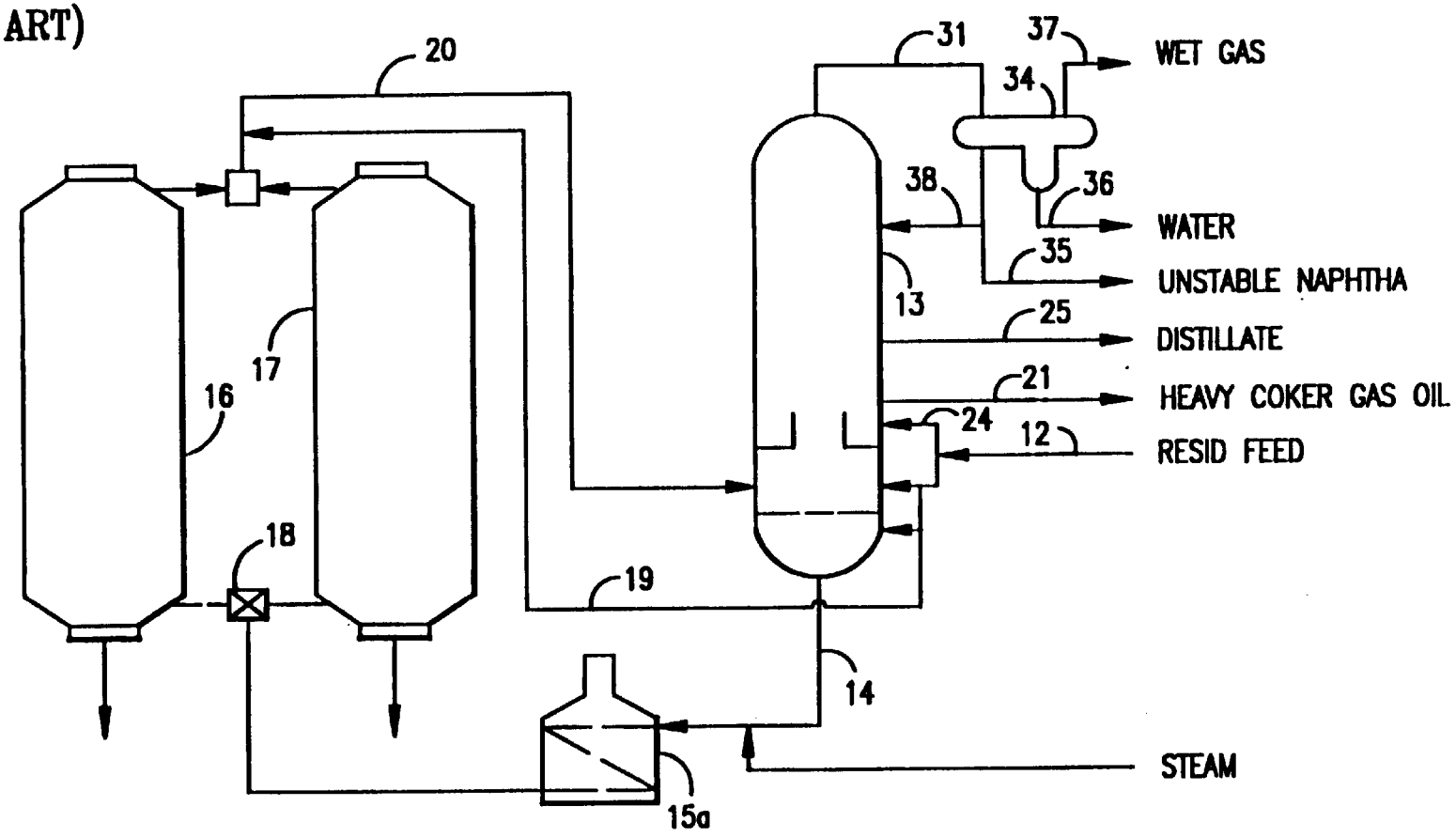
FIG. 1 (PRIOR ART)
FIG. 1 is a simplified schematic representation of a conventional delayed coker unit.

A conventional delayed coker unit is shown in FIG. 1. The heavy oil feedstock, usually a warmed vacuum residuum, enters the unit through conduit 12 which brings the feedstock to the fractionating tower 13, entering the tower below the level of the coker drum effluent. In many units the feed also often enters the tower above the level of the coker drum effluent. The feed to the coker furnace, comprising fresh feed together with the tower bottoms fraction, generally known as recycle, is withdrawn from the bottom of tower 13 through conduit 14 through which it passes to furnace 15a where it is brought to a suitable temperature for coking to occur in delayed coker drums 16 and 17, with entry to the drums being controlled by switching valve 18 so as to permit one drum to be on stream while coke is being removed from the other. The vaporous products of the coking process leave the coker drums as overheads and pass into fractionator 13 through conduit 20, entering the lower section of the tower below the chimney. Quench line 19 introduces a cooler liquid to the overheads to avoid coking in the coking transfer line 20.

Heavy coker gas oil is withdrawn from fractionator 13 and leaves the unit through conduit 21. Distillate product is withdrawn from the unit through conduit 25. Coker wet gas leaves the top of the column through conduit 31 passing into separator 34 from which unstable naphtha, water and dry gas are obtained, leaving the unit through conduits 35, 36, and 37 with a reflux fraction being returned to the fractionator through conduit 38.

In the modified delayed coking process of the instant invention, used lubricants such as automotive lubricating oils, turbine oils, jet lubricants, hydraulic fluids, marine and diesel engine oils, automatic transmission fluids, solvents, and the like and mixtures thereof are used as a co-feed in a delayed coker unit. The used oil is fed to the unit in a highly impure form. Usually, consumers mix different brands of oil, and even if consumers pay particular attention to consistently using the same brand of oil, manufacturers will change the formulation form time-to-time. Moreover, when the used oils are reclaimed for recycling or proper disposal, no attention is given to segregating the oil by grade or quality. Therefore, these used lubricating oils, typically, comprise one or more than one base lubricating oil, i.e., mineral oil or synthetic oil. The lubricating oils also contain a variety of additives which may have reacted with each other or with the base lubricant to form new compounds. The used oil also contains significant levels of oxidation by-products, ash, sludge, metals, dirt, etc. Moreover, the base oil can contain different synthetic and mineral base oil components. Examples of base components of mineral oils are the higher boiling point fractions of paraffins and naphthenes which boil above 250° C., typically from 300° C. to 550° C. Examples of the base oil components of synthetic oils include the polyalpha olefins, esters of dibasic acids, esters of polyols, alkylbenzenes and alkylnaphthalenes, polyalkylene glycols, phosphate esters and silicones. This represents only a few of the possible components which may be found in a waste lubricant reserves. Although the unknown composition of these oils would ordinarily present a serious processing dilemma to the refiner, they do not present any serious processing problems to a refiner when processed in accordance with the instant invention.

The following Table 1 presents the estimated metals content of a typical used lubricating oil:

TABLE 1

METALS CONTENT OF TYPICAL USED LUBRICATING OIL

| Element | ppmw |
|---|---|
| Arsenic | 0–5 |
| Barium | 10–50 |
| Cadmium | 0–1 |
| Chromium | 3–7 |
| Lead | 0–99 |
| Mercury | 0.2 |
| Selenium | 0 |
| Silver | 0 |
| Aluminum | 2 |
| Boron | 50 |
| Copper | 100 |
| Iron | 200 |
| Lithium | 2 |
| Manganese | 10 |
| Molydenum | 10 |
| Nickel | 0–50 |
| Phosphorous | 1000 |
| Silicon | 100 |
| Tin | 3 |
| Vanadium | 3–200 |
| Zinc | 1000 |
| Calcium | 1000 |
| Magnesium | 500 |
| Potassium | 100 |
| Sodium | 150 |
| Chlorides | 0–1700 |

In the instant process, the waste lubricant does not necessarily require the preprocessing or pretreatment steps of distilling, filtering or decanting to remove metals, sediment and other non-hydrocarbons and contaminants before admixture with the delayed coking process stream. However, mixing, agitating or stirring the lubricant before introduction to the delayed coker process stream may keep the non-hydrocarbons and other materials dispersed in the lubricant which facilitates processing.

Lubricants are low in coke precurser content. For example, lubricants contain very few of the asphaltenes, resins and heavy aromatics which react to form coke. Thus, used lubricant does not present a potential source for coke; however, the paraffin and naphthene content allows almost all of the used lubricant to convert to the valuable liquid products of the delayed coking process and at almost no extra cost to the refiner. The metals and other contaminants present in the lubricant deposit onto any coke produced by the feedstock and do not show-up in the final liquid product or in refinery emissions to any appreciable or insurmountable degree.

The used lubricant is introduced directly to the coker drum downstream of the coker heater at a rate sufficient to maintain the temperature of the coker process stream for carrying out delayed coking. Alternatively, the used lubricant is heated through an independent heater or indirectly through contact with the hot process stream or a hot slip stream to a temperature of at most about 525° C., preferably 260° C. to 425° C. and injected into a conventional delayed coker feed whereupon the waste lubricant is transformed to more valuable liquid hydrocarbons which can be used without further processing or can be processed further to produce gasoline.

A relatively low rate of introduction is important when the used lubricant is added to the feed without any preheat step. The rate of introduction of the used lubricant is up to 3, no more than 10, but preferably 3–5, volume percent based on the total volume of the feed which should avoid cooling of the coker process stream which would result in fouling in the process lines and premature coking. When more than about 10 volume percent of the lubricant is introduced to the process the preheat step is necessary to avoid the quenching effect of introducing cold used lubricant into the hot process stream. The term "quenching" is used to mean the undesirable quick cooling of the coker feedstock which causes premature coking of the normal feedstock in the furnace tubes. Although a solution to the quenching problem might be to raise the coker furnace outlet temperature to maintain the coke drum temperature, this increases the likelihood of coke formation in the furnace tubes with a concomitantly greater maintenance requirement to clean the furnace tubes.

The used lubricant is introduced downstream of the coker furnace to eliminate any harmful effects which the metals may have on the furnace, reduce process handling and avoid premature volatilization which can inhibit the product yield or result in premature lubricant degradation. Most particularly, the lubricant is introduced downstream to avoid the deleterious effect that metals can have on the coker furnace tubes by accelerating the rate of the coke deposition within the coker furnace tubes which occurs at normal coker furnace temperatures.

The preheating step also serves to partially thermally decompose the waste lubricant and drive off any water which may be dispersed in the waste lubricant. However, a flash drum can be used. The heating step, when used, is conducted for a period of time ranging from 0.1 to 3 hours, or more. Although not necessary, this step can be conducted under pressure, i.e., about 10 to 400 psi or higher.

The preheated, used lubricant is injected into a conventional feed downstream from the coker furnace. Thereafter, the entire feed is transmitted to a coker to complete the thermal decomposition. The coker is maintained at temperatures within the range of from about 400° C. to 550° C.

Figure 2:
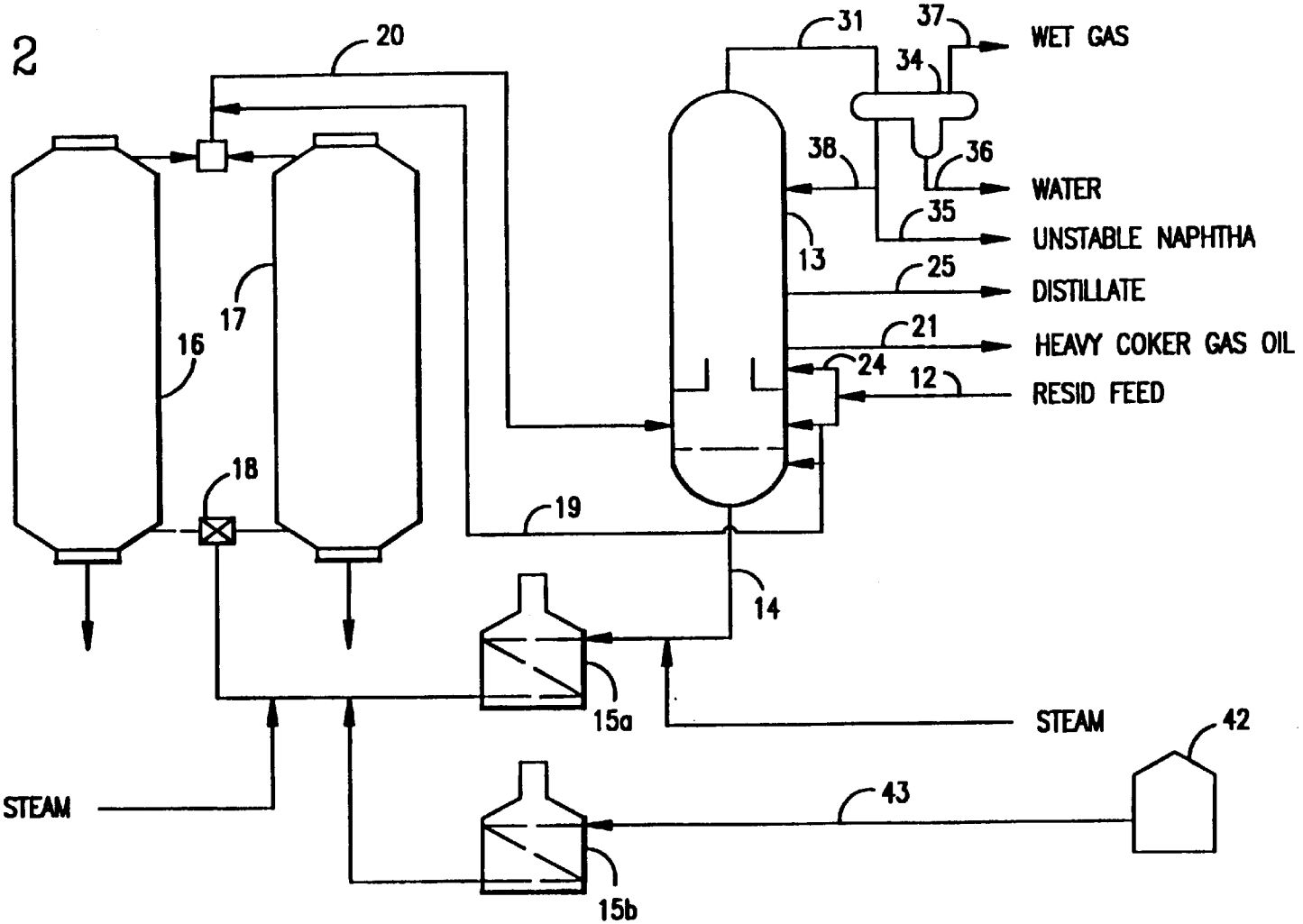
FIG. 2 is a schematic representation of the modified delayed coker unit showing the additional furnace used for preheating the reclaimed lubricant.

FIG. 2 illustrates a schematic representation of the delayed coking unit of the instant invention in which the independent used lubricant heater is employed. For convenience, most related parts of the unit are given the same reference numerals as in FIG. 1. This unit operates in the same manner as the unit shown in FIG. 1 with respect to the conventional coker feedstock. However, the unit comprises an independent heater which heats the used lubricant to at most about 525° C., more specifically from 260° C. to 425° C. The warmed conventional feedstock enters the unit through conduit 12, which brings the feedstock to the fractionating tower below the level of the coker drum effluent. The feed to the coker furnace, comprising fresh feed together with the recycle, is withdrawn from the bottom of tower 13 through conduit 14 through which it passes to furnace 15a where it is brought to a suitable temperature, typically ranging from about 400° C.–550° C. The used lubricant is brought at atmospheric temperature (about 20° C.) from storage 42 to a supplemental furnace 15b through conduit 43 and is heated in the independent heater to a temperature ranging from at most about 525° C. specifically, 260° C.–425° C. The heated used lubricant is injected into the conventional coker feed downstream of the coker furnace which is traveling to the delayed coking drums 16 and 17 through conduit 14. The independent heater is necessary when the used lubricant is injected at an injection rate ranging from more than about 3%, preferably when the injection rate is greater than from about 3–5%, no more than 10%, by volume of the total amount of fresh feed. To correct any small quench on the process stream, the heater 15a outlet temperature is increased slightly about 0.1° to 20° C. to maintain coke drum temperatures. In the normal way, entry to the drums is controlled by switching valve 18 so as to permit one drum to be on stream while coke is being removed from the other. The liquid products of the coking process, the vaporous cracked products, heavy coker gas oil, distillate and coker wet gas can be used as is or can be further processed, as the case with any conventional coker product.

Stream blowback is used in the process to prevent plugging of the connection used to route the oil into the furnace effluent transfer line and to help mix the lubricating oil into the coker feed process stream. The steam can be supplied by conventional sources, it can be process steam or purchased.

An important aspect of this process is that the undesirable heavy metals and other undesirable components in the used oil deposit on the coke. These harmful metals are not found in the liquid product to any prohibitive degree.

The invention is illustrated in the following Example in which all parts, proportions and percentages are by weight unless stated to the contrary.

EXAMPLE

To illustrate the effect of this process on an existing delayed coker unit, a test run is performed on a commercial coker feedstock. The composition of furnace feed samples comprise a normal coker feed injected with a lubricant oil slop which is comparable to a used lubricating oil. The metals content of the lubricating oil slop is shown in Table 2. For comparative purposes, the metals content of a conventional coker feed is also shown in Table 2. The metals content in both is evaluated before the test and during the test. In the test run, the used lubricant is injected without preheat and at a relatively low injection rate of 1.35% by volume of the total feed. The test is conducted under the steady state conditions as set forth in Table 3. The process is fitted with a 6.5 gpm positive displacement pump capable of 150 psig discharge pressure and a local flow meter ranged for 159 B/D. Steam is used to prevent pluggage of the connection and to mix the lubricant into the coker furnace process feed. In the test 18,100 gallons of used lubricant are processed using four coke drums over a period of about 3 days. For the first two test drums, 500 barrels of sludge are added to the quench water which is used to cool and remove the coke. No sludge is added to the last two drums.

TABLE 2

| | LUBE-OIL-SLOP | | COKER FURNACE FEED | |
|---|---|---|---|---|
| | Pre-test | Test | Pre-test | Test |
| Arsenic | | | NT | NT |
| Barium | 2 | 2 | NT | NT |
| Cadmium | | | NT | NT |
| Chromium | TR | TR | TR | TR |
| Lead | TR | TR | 1 | 2 |
| Mercury | | | NT | TR |
| Selenium | | | NT | NT |
| Silver | 1 | TR | TR | TR |

TABLE 2-continued

| | LUBE-OIL-SLOP | | COKER FURNACE FEED | |
|---|---|---|---|---|
| | Pre-test | Test | Pre-test | Test |
| Aluminum | TR | TR | TR | TR |
| Boron | | | TR | TR |
| Copper | 5 | 5 | TR | TR |
| Iron | 1 | 1 | 17 | 16 |
| Lithium | | | NT | NT |
| Manganese | | | NT | NT |
| Molydenum | TR | TR | TR | TR |
| Nickel | NT | 80 | NT | 58 |
| Phosphorus | 190 | 190 | TR | TR |
| Silicon | 6 | 3 | 2 | 1 |
| Tin | TR | TR | TR | TR |
| Vanadium | NT | 111 | NT | 210 |
| Zinc | 205 | 216 | 2 | 2 |
| Calcium | 810 | 760 | 2 | 3 |
| Magnesium | 56 | 56 | 2 | 2 |
| Potassium | NT | NT | NT | NT |
| Sodium | TR | TR | NT | 17 |
| Chlorides | <100 | 930 | NT | NT |

Legend
TR = Trace Result
NT = No Test
Blank = None detected

TABLE 3

| PROCESS OPERATING CONDITIONS | PRE-TEST | TEST |
|---|---|---|
| TEMPERATURES (° F.): | | |
| B Heater outlet | 914 | 925 |
| Drum inlet | 880 | 880 |
| Drum vapor line | 788 | 788 |
| PRESSURES (psig): | | |
| Drum | 30 | 30 |
| Heater outlet | 52 | 52 |
| Lube pump discharge | — | 84 |

TABLE 3-continued

| PROCESS OPERATING CONDITIONS | PRE-TEST | TEST |
|---|---|---|
| FLOWS: | | |
| Furnace inlet rate (B/D) | 10340 | 10340 |
| Simulated used lubricant addition rate (B/D) | — | 141 |
| Volume % of slop oil in total feed | — | 1.35 |

Table 4 presents the results of an analysis of the metals content of the final liquid product and the drain water. As shown in Table 4, the test process does not appreciably increase the metal concentration of any of the liquid products. Comparing the results, although there is a change in the concentration of certain metals as a consequence of the addition of a simulated used lubricant oil to the process stream, the change is inconsequential in comparison to the concentrations detected in the starting used lubricant oil. Note particularly that vanadium, zinc, calcium salt and magnesium salt are present in the slop in very large quantities, i.e., in parts per million, vanadium=111, zinc=216, calcium salt=760 and magnesium salt=56. However, relatively low concentrations of these materials turned up in the liquid products and drain water when compared to the large concentration contained in the used lubricant oil. As far as any notable increases in concentration, the process removes the larger proportion of contaminants leaving the instant liquid products with manageable levels, whereby the fractions can undergo further processing in existing refinery equipment to remove the undesirable amounts which remain in the products. From the test results, it is concluded that a waste lubricant feed which contains a large metals content would produce liquid coker products having acceptable levels of these metals.

TABLE 4

PRODUCT ANALYSIS

| | RCRA | LT Gasoline | | | HVY Gasoline | | | LT Gas Oil | | | HVY Gas Oil | | | COKE | | Drain H2O | |
|---|---|---|---|---|---|---|---|---|---|---|---|---|---|---|---|---|---|
| | LIMIT | 1 | 11 | 111 | 1 | 11 | 111 | 1 | 11 | 111 | 1 | 11 | 111 | 1 | 11 | 1 | 11 |
| Arsenic | 5 | NT | NT | NT | NT | NT | NT | NT | NT | NT | NT | NT | NT | NT | NT | NT | NT |
| Barium | 100 | | | | | | | NT | | NT | NT | NT | NT | | | TR | TR |
| Cadmium | 1 | | | | | | | NT | | NT | NT | NT | NT | | | | |
| Chromium | 5 | | | | | TR | | TR | TR | 1 | TR | TR | TR | | | | |
| Lead | 5 | | | | | TR | | TR | TR | TR | TR | TR | TR | | | | |
| Mercury | 0.2 | NT | 0 | NT | NT | 0 | NT | NT | TR | NT | NT | TR | NT | | | NT | TR |
| Selenium | 1 | NT | NT | NT | NT | NT | NT | NT | | NT | NT | NT | NT | NT | NT | NT | NT |
| Silver | 5 | NT | NT | NT | NT | NT | NT | TR | TR | 2 | TR | TR | TR | NT | NT | NT | NT |
| Aluminum | | 1 | 3 | TR | 1 | 1 | TR | TR | TR | | TR | TR | TR | 150 | 167 | 4 | 1 |
| Boron | | | | | | | TR | TR | TR | TR | TR | TR | | | | | |
| Copper | | TR | TR | TR | TR | TR | TR | TR | TR | TR | TR | TR | TR | TR | TR | | |
| Iron | | 2 | 2 | 1 | 2 | 2 | 1 | TR | TR | TR | TR | TR | TR | 364 | 333 | 24 | 2 |
| Lithium | | | | | | | | NT | | NT | NT | NT | NT | | | | |
| Manganese | | | | | | | | NT | | NT | NT | NT | NT | | | TR | TR |
| Molydenum | | | | | | | | TR | TR | TR | TR | TR | TR | | | | |
| Nickel | | TR | TR | TR | TR | TR | | NT | TR | NT | TR | 2 | NT | 145 | 162 | TR | TR |

TABLE 4-continued

PRODUCT ANALYSIS

| RCRA | LT Gasoline | | | HVY Gasoline | | | LT Gas Oil | | | HVY Gas Oil | | | COKE | | Drain H2O | |
|---|---|---|---|---|---|---|---|---|---|---|---|---|---|---|---|---|
| LIMIT | 1 | 11 | 111 | 1 | 11 | 111 | 1 | 11 | 111 | 1 | 11 | 111 | 1 | 11 | 1 | 11 |
| Phosphorus | NT | NT | NT | NT | NT | NT | TR | TR | TR | TR | TR | TR | | | NT | NT |
| Silicon | NT | NT | NT | NT | NT | NT | 2 | 5 | 3 | 1 | 2.4 | 1.5 | NT | NT | NT | NT |
| Tin | | | | | | | 2 | 2 | 1 | 2 | 1 | 1 | | | | |
| Vanadium | | | | | | | NT | TR | NT | 0.3 | 0.3 | NT | 420 | 417 | TR | TR |
| Zinc | 1 | 3 | TR | 2 | 2 | 1 | TR | 1 | TR | TR | TR | TR | 68 | 85 | 4 | 1 |
| Calcium | 5 | 9 | 1 | 9 | 7 | 2 | TR | 3 | TR | TR | TR | TR | 373 | 350 | 29 | 25 |
| Magnesium | 1 | 1 | TR | 1 | 1 | 1 | <1 | 1 | <1 | 1 | TR | TR | 120 | 120 | 17 | 11 |
| Potassium | | 2 | | | | | NT | TR | NT | NT | NT | NT | | | 5 | 3 |
| Sodium | NT | NT | NT | NT | 1 | NT | TR | TR | TR | TR | TR | TR | NT | NT | NT | NT |
| Chlorides | NT | NT | NT | NT | NT | NT | NT | NT | NT | NT | NT | NT | NT | NT | NT | NT |

Legend:
1 = Pretest
11 = TEST
111 = Post Test
TR = Trace Result
NT = No Test
Blank = None Detected
Underlined = Notable Concentration Change Table 5 presents the results of an analysis of the physical properties of the lubricant and the coker liquid products. It will be noted that the products are lower in sulfur and nitrogen content than the co-fed lubricant-slop.

Table 5 also presents the results of a physical analysis of each hydrocarbon fraction produced by the instant process. The product components are identified by their boiling points. The initial boiling point is determined for the slop lubricant and the different hydrocarbon fractions contained in the total feed both before the test and during the test. As the indicated amounts of liquid product distill-off, the boiling point of each fraction is determined. These values are reported in Table 5. Light gasoline boils from 86° F. to 158° F., heavy gasoline boils from 221° F. to 408° F., light gas oil boils from 354° F. to 647° F. and heavy coker gas oil boils from 356° F. to 1001° F. The lubricant slop contains hydrocarbon fractions boiling within the range of each of these fractions and it can be concluded that each fraction distilled from the lubricant slop contributed to the total liquid product yield. It will also be noted that the sulfur and nitrogen content of the heavy gasoline is within tolerable limits.

TABLE 5

PRODUCT PROPERTIES

| | LUBE | LT Gasoline | | HVY Gasoline | | LT Gas Oil | | HVY Gas Oil | |
|---|---|---|---|---|---|---|---|---|---|
| | SLOP | Pre-Test | Test | Pre-Test | Test | Pre-Test | Test | Pre-Test | Test |
| Dist. Data: | | | | | | | | | |
| IBP | 542 | 86 | 86 | 221 | 221 | 337 | 354 | 394 | 356 |
| 5% | 649 | | | | | | | 547 | 540 |
| 10% | 687 | 100 | 103 | 241 | 240 | 432 | 431 | 603 | 602 |
| 20% | 732 | | | | | | | 657 | 657 |
| 30% | 769 | | | | | | | 696 | 686 |
| 50% | 832 | 121 | 120 | 293 | 288 | 512 | 498 | 753 | 754 |
| 70% | 895 | | | | | | | 814 | 826 |
| 90% | | 154 | 146 | 375 | 362 | 625 | 585 | 908 | 951 |
| 95% | | | | | | | | 950 | — |
| EP | 966 | 158 | 158 | 424 | 408 | 692 | 647 | 997 | 1001 |
| Residue % | 10 | 0 | 0.8 | 1.0 | 0.9 | 0.7 | 0.5 | 1.0 | 5.0 |
| Loss % | 1 | 7.9 | 1.1 | 0.5 | 0.5 | 0.2 | 0.2 | 1.0 | 1.0 |
| Density (DEG API) | 29.2 | — | — | 52.8 | 53.7 | 33.8 | 34.7 | 19.1 | 21.4 |
| Vis 40 C. | 47.7 | — | — | — | — | — | — | — | — |
| Vis 100 C. | 7.5 | — | — | — | — | — | — | — | — |
| VI | 111 | — | — | — | — | — | — | — | — |
| Pour Pt (F.) | −10 | — | — | — | — | — | — | — | — |
| Flash Pt (F.) | 400 | — | — | — | — | — | — | — | — |
| CCR wt % | 0.5 | — | — | — | — | — | — | — | — |

TABLE 5-continued

| | PRODUCT PROPERTIES | | | | | | | | |
|---|---|---|---|---|---|---|---|---|---|
| | LUBE | LT Gasoline | | HVY Gasoline | | LT Gas Oil | | HVY Gas Oil | |
| | SLOP | Pre-Test | Test | Pre-Test | Test | Pre-Test | Test | Pre-Test | Test |
| Sulfur wt % | 1.04 | — | — | 0.5 | 0.44 | — | — | — | — |
| Nitrogen wt % | 0.04 | — | — | — | — | — | — | — | — |
| Chlorides ppm | NT | — | — | — | — | — | — | — | — |

Legend:
EP = end product
— = not tested
IBP = initial boiling point

We claim:

1. A process of used lubricating oil recycling which comprises:

(a) introducing a coker feed to the coker furnace which elevates the temperature of the coker feed to a temperature necessary to carry-out delayed coking of the feed;

(b) recycling a used lubricating oil by adding the lubricating oil to the heated coker feed downstream of the coker furnace at a rate sufficient to maintain the temperature of the coker process stream at a temperature sufficient for delayed coking and to prevent premature coking of the feed; and (c) carrying out delayed coking of the feedstock in a coker drum from which coke and liquid coker products are removed.

2. A process as described in claim 1 in which the used lubricating oil is added to the coker feed at a rate up to about 10 volume percent based on the total volume of the feed.

3. A process as described in claim 1 in which the used lubricating oil is preheated prior to addition to the heated coker feed in an independent coker furnace.

4. A process as described in claim 3 in which the used lubricating oil is added to the delayed coker at a rate of more than about 3 volume percent based on the total volume of the feed.

5. A process as described in claim 3 in which the independent used lubricating oil furnace outlet temperature is at most about 525° C.

6. A process as described in claim 1 in which the coker furnace outlet temperature ranges from about 400° C. to 525° C.

7. A process as described in claim 3 in which the heater outlet temperature is raised from about 0.1° C. to 20° C. to maintain the coker drum temperature.

8. A process as described in claim 1 in which the coker drum inlet temperature ranges from about 400° C. to 550° C.

9. A process as described in claim 1 in which steam blowback is used to mix the used lubricating oil with the process stream.

10. A process as described in claim 1 in which refinery sludge is added to a coker quench water in the process of removing the coke.

11. A process of making liquid hydrocarbon fuels from a used lubricating oil in a delayed coking process which comprises:

(a) heating a coker feedstock to an elevated coking temperature in a coker furnace;

(b) injecting it with a used lubricating oil heated to an elevated temperature in an independent used lubricating oil furnace, whereby the heated used lubricating oil is a coker co-feed;

(c) mixing the used lubricating oil with the process stream; and (d) carrying out delayed coking of the heated feedstock in a coker drum from which solid and liquid coking products are removed, said liquid coking products include hydrocarbons which are suitable as liquid hydrocarbon fuels.

12. A process as described in claim 11 in which the independent used lubricating oil furnace outlet temperature is at most about 525° C.

13. A process as described in claim 11 in which the heated used lubricating oil is cofed into the process stream at an injection rate of more than about 3 volume percent based on the total volume of the feedstock.

14. A process as described in claim 11 in which the coker furnace outlet temperature ranges from about 400° C. to 550° C.

15. A process as described in claim 11 in which the heater outlet temperature is raised about 0.1° C. to 20° C. to maintain coker drum temperature.

16. A process as described in claim 11 in which the coker drum inlet temperature ranges from about 425° C. to 500° C.

17. A process as described in claim 11 in which steam blowback is used to mix the lubricating oil with the process steam.

18. A process as described in claim 11 which further comprises a step of quenching the hot coke.

19. A process of reclaiming a used lubricating oil in a delayed coking process comprising (a) cofeeding the used lubricating oil containing large quantities of metal contaminants, heated in an independent furnace prior to cofeeding the oil into a heated coker feedstock process stream downstream of the coker furnace; and (b) reclaiming the used lubricating oil by carrying out delayed coking of the feedstock in a coker drum from which useful liquid and solid coker products are removed.

20. A process as described in claim 19 in which the outlet temperature of the used lubricating oil independent furnace is at most about 525° C.

21. A process as described in claim 19 in which the heated used lubricating oil is injected into the process stream at an injection rate of more than about 3 volume percent based on the total volume of the feedstock.

22. A process as described in claim 19 in which the coker furnace outlet temperature ranges from about 400° C. to 550° C.

23. The process as described in claim 18 in which a sludge is added to the coker as a quench liquid in the step of quenching the coke.

*24. In a delayed coking process in which a delayed coking feedstock is subjected to delayed coking wherein the improvement comprises conducting delayed coking of a mixture of a used lubricating oil and a delayed coking feedstock.*

*25. The delayed coking process of claim 24 in which the mixture of used lubricating oil and delayed coking feedstock comprises up to 10 volume percent based on the total volume of the feed of used lubricating oil.*

* * * * *